US010480953B2

(12) United States Patent
Leach

(10) Patent No.: US 10,480,953 B2
(45) Date of Patent: Nov. 19, 2019

(54) SEMI-AUTONOMOUS MONITORING SYSTEM

(71) Applicant: Halliburton Energy Services, Inc., Houston, TX (US)

(72) Inventor: Nathan P. Leach, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 2 days.

(21) Appl. No.: 15/573,978

(22) PCT Filed: Jul. 7, 2015

(86) PCT No.: PCT/US2015/039377
§ 371 (c)(1),
(2) Date: Nov. 14, 2017

(87) PCT Pub. No.: WO2017/007456
PCT Pub. Date: Jan. 12, 2017

(65) Prior Publication Data
US 2018/0292223 A1    Oct. 11, 2018

(51) Int. Cl.
*G01C 21/34* (2006.01)
*H04N 5/232* (2006.01)
(Continued)

(52) U.S. Cl.
CPC .......... *G01C 21/3469* (2013.01); *B64C 39/02* (2013.01); *B64D 47/08* (2013.01);
(Continued)

(58) Field of Classification Search
USPC ......................................................... 701/4
See application file for complete search history.

(56) References Cited

U.S. PATENT DOCUMENTS 7,834,760 B2   11/2010   Armstrong et al.
7,876,224 B2   1/2011    Prokopuk et al.
(Continued)

FOREIGN PATENT DOCUMENTS

EP         2482024         8/2012

OTHER PUBLICATIONS

Aerovironment, "Wildlife Monitoring Drone", available at https://www.avinc.com/glossary/wildlife_monitoring_drone, retrieved on, Jul. 7, 2015, 5 pages.

(Continued)

*Primary Examiner* — Tyler D Paige
(74) *Attorney, Agent, or Firm* — Kilpatrick Townsend & Stockton LLP

(57) ABSTRACT

A monitoring system may include a semi-autonomous mobile monitoring device capable of determining whether it has a sufficient power level to perform a monitoring task based on the distance between the position of the mobile monitoring device and a task area corresponding to the monitoring task. Upon determining a sufficient power level to perform the monitoring task, the mobile monitoring device may calculate a path to a task area corresponding to the monitoring task based on map information stored in a memory of the mobile monitoring device. The mobile monitoring system may automatically avoid known obstacles in the monitoring area between the position of the mobile monitoring device and the task area without using a remote control.

20 Claims, 11 Drawing Sheets

(51) Int. Cl.
*G05D 1/02* (2006.01)
*B64D 47/08* (2006.01)
*B64C 39/02* (2006.01)
*H04N 7/18* (2006.01)
*B64F 5/10* (2017.01)
*G01C 21/20* (2006.01)
*G05D 1/00* (2006.01)
*G05D 1/10* (2006.01)

(52) U.S. Cl.
CPC .......... *B64F 5/10* (2017.01); *G01C 21/20* (2013.01); *G01C 21/3415* (2013.01); *G01C 21/3461* (2013.01); *G05D 1/0094* (2013.01); *G05D 1/0214* (2013.01); *G05D 1/0225* (2013.01); *G05D 1/101* (2013.01); *H04N 5/23203* (2013.01); *H04N 5/23216* (2013.01); *H04N 5/23296* (2013.01); *H04N 7/185* (2013.01); *B64C 39/024* (2013.01); *B64C 2201/024* (2013.01); *B64C 2201/027* (2013.01); *B64C 2201/123* (2013.01); *B64C 2201/127* (2013.01); *B64C 2201/146* (2013.01); *G05D 2201/0207* (2013.01)

(56) References Cited

U.S. PATENT DOCUMENTS

| | | | |
|---|---|---|---|
| 8,267,789 B2 | 9/2012 | Nelson et al. | |
| 8,346,391 B1 | 1/2013 | Anhalt et al. | |
| 8,606,439 B2 | 12/2013 | Miller et al. | |
| 8,618,928 B2 | 12/2013 | Weed et al. | |
| 8,682,485 B2 | 3/2014 | Anhalt et al. | |
| 8,730,461 B2 | 5/2014 | Andreussi et al. | |
| 8,744,647 B2 | 6/2014 | Paulsen et al. | |
| 8,977,481 B1* | 3/2015 | Downs | G08G 5/0017 701/120 |
| 8,989,922 B2 | 3/2015 | Luther et al. | |
| 9,036,861 B2 | 5/2015 | Chen et al. | |
| 9,061,102 B2 | 6/2015 | Levien et al. | |
| 9,063,544 B2 | 6/2015 | Vian et al. | |
| 9,248,915 B2* | 2/2016 | Hayes | B64D 45/00 |
| 9,373,262 B2* | 6/2016 | Stigler | B64B 1/10 |
| 9,454,151 B2* | 9/2016 | Srivastava | G08G 1/00 |
| 9,454,157 B1* | 9/2016 | Hafeez | G05D 1/104 |
| 9,508,263 B1* | 11/2016 | Teng | B64C 39/024 |
| 9,581,443 B2* | 2/2017 | Gil | G05D 1/0038 |
| 2006/0106506 A1* | 5/2006 | Nichols | G05D 1/101 701/3 |
| 2010/0223008 A1 | 9/2010 | Dunbabin et al. | |
| 2011/0035149 A1* | 2/2011 | McAndrew | G05D 1/0038 701/466 |
| 2012/0049798 A1 | 3/2012 | Cohen et al. | |
| 2012/0097461 A1 | 4/2012 | Rudakevych | |
| 2012/0143482 A1* | 6/2012 | Goossen | G08G 5/0034 701/120 |
| 2013/0197718 A1 | 8/2013 | Lee et al. | |
| 2014/0018979 A1* | 1/2014 | Goossen | G08G 5/0034 701/3 |
| 2014/0316616 A1* | 10/2014 | Kugelmass | G05D 1/101 701/8 |
| 2015/0158392 A1* | 6/2015 | Zhao | B60L 11/1861 320/109 |
| 2015/0336671 A1* | 11/2015 | Winn | B64C 39/024 701/3 |
| 2016/0216711 A1* | 7/2016 | Srivastava | B64D 1/02 |
| 2016/0250933 A1* | 9/2016 | Kim | B60L 11/182 320/108 |
| 2016/0307447 A1* | 10/2016 | Johnson | G05D 1/0044 |
| 2016/0347462 A1* | 12/2016 | Clark | B64C 39/024 |
| 2017/0337824 A1* | 11/2017 | Chen | G08G 5/0086 |

OTHER PUBLICATIONS

Fujii et al., "Endless Flyer: A Continuous Flying Drone with Automatic Battery Replacement", 2013, 8 pages.
International Patent Application No. PCT/US2015/039377, "International Search Report and Written Opinion", dated Mar. 31, 2016, 13 pages.
Steele, "NASA and Verizon research drone monitoring with cell towers", Jun. 3, 2015, 3 pages.
Toksoz et al., "Automated Battery Swap and Recharge to Enable Persistent UAV Missions", retrieved from the internet as early as http://acl.mit.edu/papers/infotech-recharge-2011.pdf, Jul. 7, 2015, 10 pages.

* cited by examiner

SEMI-AUTONOMOUS MONITORING SYSTEM

TECHNICAL FIELD

The present disclosure relates generally to monitoring systems and, more particularly (although not necessarily exclusively), to semi-autonomous monitoring systems for monitoring defined areas.

BACKGROUND

Monitoring systems may be used to surveil objects and activities. The area that can be surveilled may be enlarged when using mobile monitoring devices. But, a mobile monitoring device may be prone to damage. For example, a surveillance area may include numerous obstacles that increase the risk of a crash as a mobile monitoring device navigates within the area. Further, navigating to perform a monitoring task may drain the power supply of the mobile monitoring device. For land mobile monitoring devices, a loss of power during a monitoring task may result in damage to the mobile monitoring device if, for example, the monitoring devices is stranded in a position where it is exposed to a hazard in the surveillance area. For air mobile monitoring devices, a loss of power may result in damage by falling to the ground or otherwise crashing subsequent to the loss of power.

DETAILED DESCRIPTION

Figure 1:
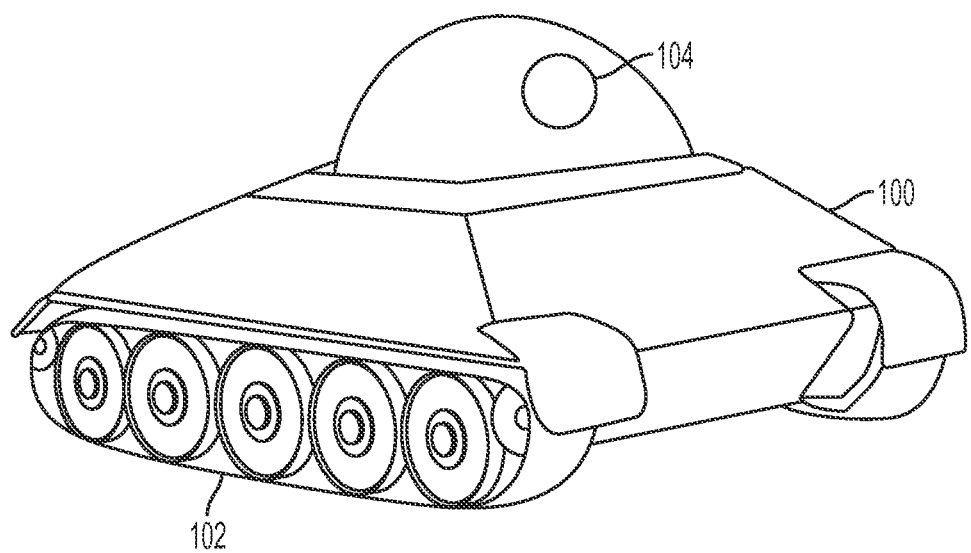
FIG. 1 is a perspective view of one example of a mobile monitoring device for a monitoring system according to one aspect of the present disclosure.

Certain aspects and examples of the present disclosure relate to a semi-autonomous mobile monitoring device capable of determining whether it has a sufficient power level to perform a monitoring task based on its current power level and the distance between the position of the mobile monitoring device and a task area corresponding to the monitoring task. The mobile monitoring device may receive the monitoring task from a control unit. The monitoring task may include a corresponding task area within a monitoring area where the monitoring task may be performed by the mobile monitoring device. Upon determining a sufficient power level to perform the monitoring task, the mobile monitoring device may calculate a path to the task area. The path may be calculated based on map information stored in a memory of the mobile monitoring device to allow the mobile monitoring device to autonomously navigate to the task area. The mobile monitoring system may also avoid known obstacles in the monitoring area between the position of the mobile monitoring device and the task area without using a remote control or other controller device for navigating the mobile monitoring device.

The mobile monitoring device may provide a more dynamic platform for monitoring a variety of activities and may facilitate data collection. For example, a monitoring system having one or more mobile monitoring devices may be used to monitor oilfield equipment at a hydraulic fracturing site, or frack site. The mobile monitoring devices may allow for the surveillance of both safe and hazardous locations on the frack site. A control unit may assign a monitoring task to the mobile monitoring device in response to a request for data about the frack site. For example, an employee may wish to know the inventory of a tanker truck present in an area of the frack site. In one aspect, the control unit may assign a mobile monitoring device the task of capturing an aerial recording a designated area of the frack site for tanker trucks and transmit that information to the control unit. The control unit may allow the information transmitted from the mobile monitoring device to be accessible to the employee or other personnel to determine the number of tanker trucks based on a review of the captured recording. In other aspects, the control unit may interface with an inventory system and equipment systems to determine the inventory, and assign the mobile monitoring device the task of confirming the presence of the tanker trucks in the monitoring area. The use of mobile monitoring devices to perform monitoring tasks may prevent overcrowding of the frack site with personnel that would otherwise be employed to perform the monitoring tasks. The mobile monitoring devices may also be able to perform the task more efficiently and effectively.

Further, the semi-autonomous nature of the monitoring system may prove more cost effective than controlled monitoring systems. The reduction of human intervention in the mobility of the mobile monitoring devices may result in a reduction in the number of crashes experienced by the mobile monitoring devices, as well as the corresponding costs of replacing or repairing damaged mobile monitoring devices. If the mobile monitoring device determines that it is unable to perform a monitoring task, the mobile monitoring device may reject the monitoring task and not risk hazardous exposure or a potential crash due to a loss of power. The mobile monitoring device may also be programmed to monitor its power levels throughout performance of the monitoring task to ensure its ability to return safely to a home location prior to losing power. Further, the risk of a collision or crash in the monitoring area may be significantly reduced by the ability of the mobile monitoring device to navigate a path and automatically avoid known obstacles in the monitoring area. There may be additional cost-savings and efficiencies as the personnel that would otherwise be needed to oversee the mobility of a remote-controlled mobile monitoring device may be reduced, eliminated, or reassigned to other jobs in the frack site.

Figure 2A:
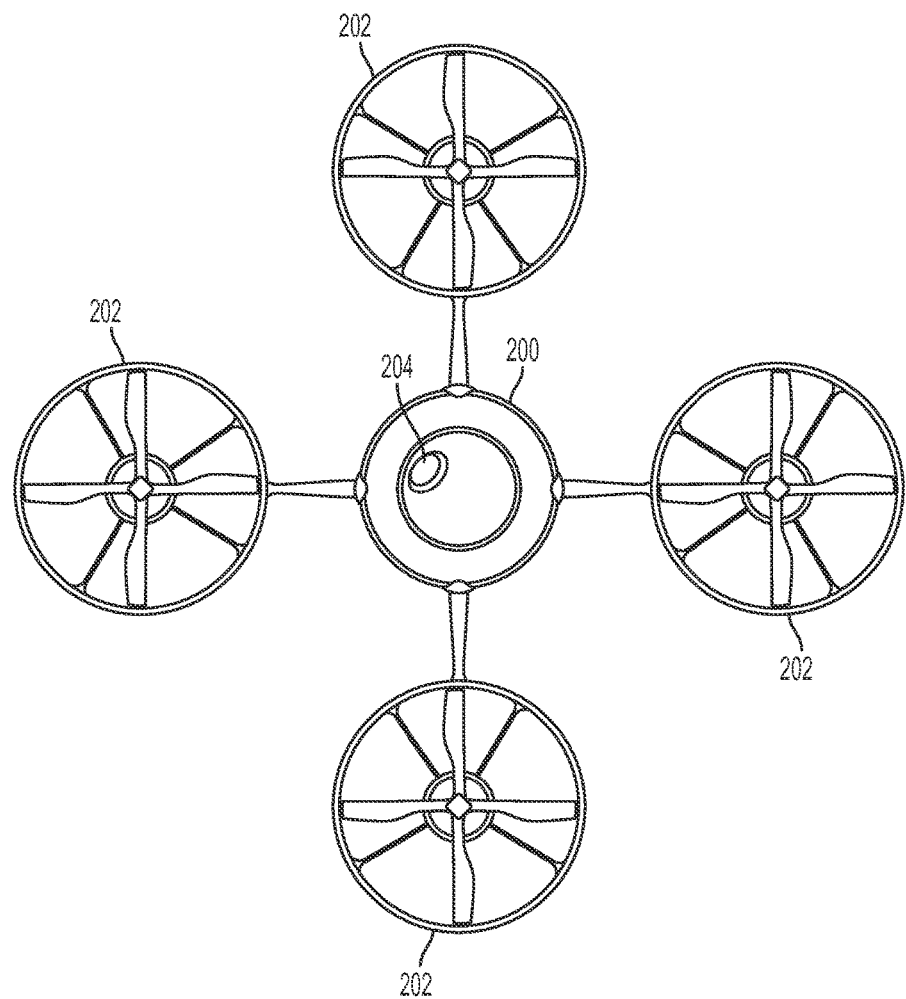
FIG. 2A is a bottom view of another example of a mobile monitoring device according to one aspect of the present disclosure.
Figure 2B:
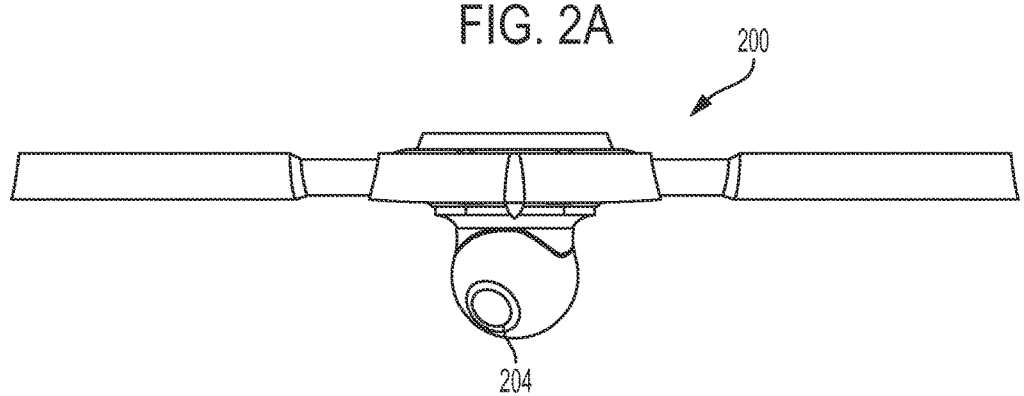
FIG. 2B is a side view of the mobile monitoring device of FIG. 2A according to one aspect of the present disclosure.

FIGS. 1, 2A, and 2B illustrate examples of such mobile monitoring devices for a mobile system. FIG. 1 illustrates a mobile monitoring device 100 that may perform monitoring tasks in a monitoring area by traversing the ground. The mobile monitoring device 100 is equipped with a mobility subsystem including wheels 102. The wheels 102 may provide the mobile monitoring device 100 ground mobility between and within a home base and a monitoring area. The mobile monitoring device 100 may be assigned a task within the monitoring area. The mobile monitoring device 100 may create a path along the ground to the monitoring area or a specified task area within the monitoring area to complete the task. The mobile monitoring device 100 may be programmed to navigate to the task area and avoid any known obstacles on the ground (e.g., a drill rig in a frack site). The mobile monitoring device 100 includes a monitoring subsystem having a camera 104. The camera 104 may be capable of generating still images or recordings that may be transmitted to a control unit and accessible for viewing by local or remote personnel. Although the mobile monitoring device 100 includes the camera 104, the monitoring subsystem of the mobile monitoring device 100 may include various monitoring devices for completing an assigned monitoring task (e.g., sensor, thermometer, etc.). Further, although the mobile monitoring device 100 includes wheels 102, the mobility subsystem of the mobile monitoring device 100 may include various components for traveling between and within a home base and monitoring area.

For example, FIGS. 2A and 2B illustrate a mobile monitoring device 200 that is equipped with a mobility subsystem including propellers 202 for aerial mobility between and within a home base and a monitoring area. The propellers 202 may provide the mobile monitoring device 200 aerial mobility between and within a home base and a monitoring area. The mobile monitoring device 200 may be assigned a task within the monitoring area. The mobile monitoring device 200 may create an aerial path to the monitoring area or a specified task area within the monitoring area to complete the task. Similar to the mobile monitoring device 100, the mobile monitoring device 200 may be programmable to navigate to the task area and avoid any known obstacles in the monitoring area that extend into the air (e.g., a crane, a drill rig). Similar to the mobile monitoring device 100, the mobile monitoring device 200 includes a camera 204. The camera 204 may be capable of generating still images or recordings that may be transmitted to a control unit and accessible for viewing by local or remote personnel.

Figure 3:
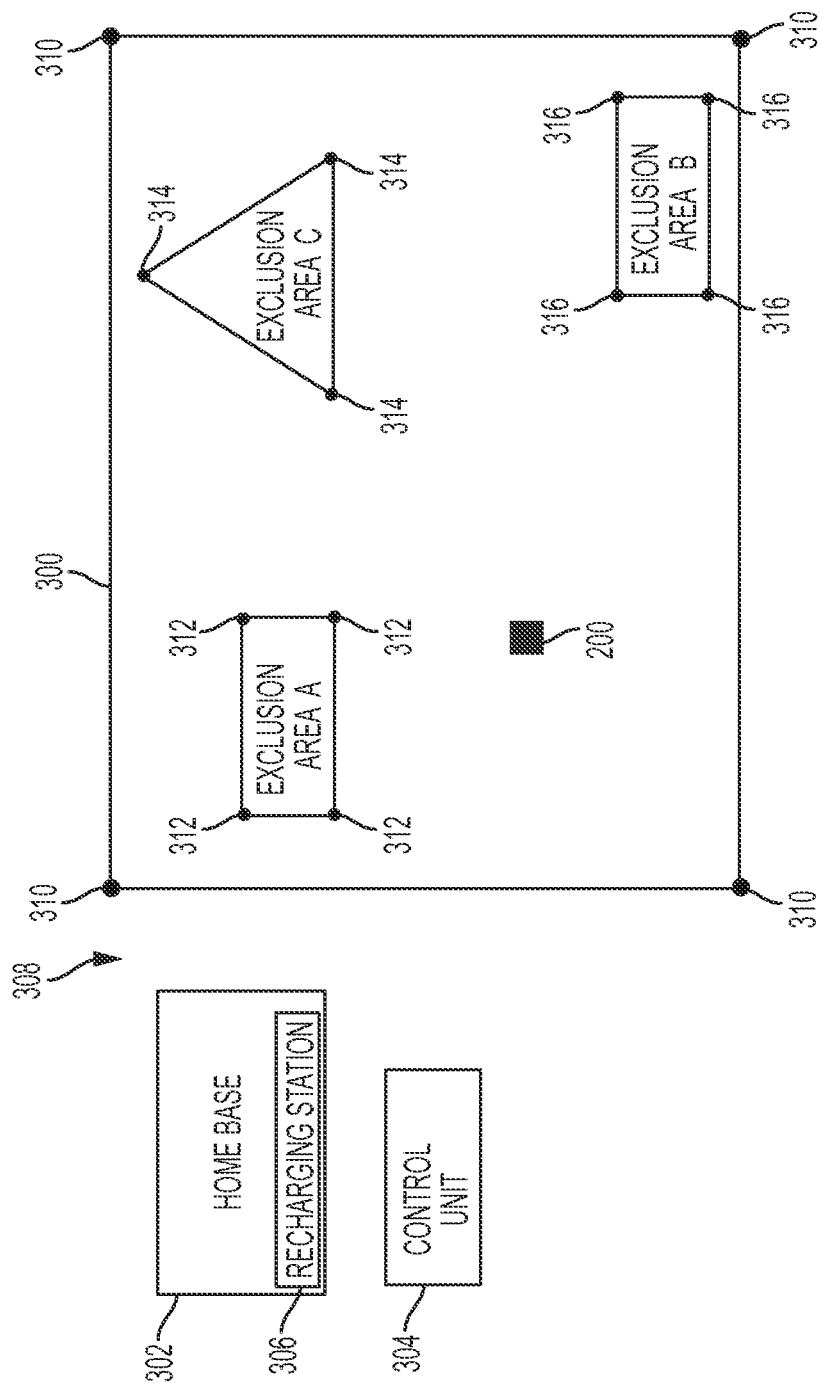
FIG. 3 is a schematic view of an example of an environment for a mobile monitoring system according to one aspect of the present disclosure.

FIG. 3 shows an example of an environment in which either, or both, of the mobile monitoring devices 100, 200 may operate. The environment includes a monitoring area 300 and a home base 302. The monitoring area 300 may define the area in which the mobile monitoring devices 100, 200 may perform monitoring tasks. For example, the monitoring area 300 may be a frack site having oilfield equipment and personnel. The mobile monitoring device 200 may be assigned monitoring tasks by a control unit 304 to be performed within the monitoring area 300. The control unit 304 may be positioned outside of the monitoring area 300 as shown in FIG. 3. In other aspects, the control unit 304 may be positioned within the boundaries of the monitoring area 300.

The home base 302 may represent a location in which the mobile monitoring device 200 may be stationed when it is not performing a monitoring task. The home base 302 includes a recharging station 306 where the mobile monitoring device 200 may return to recharge its power levels to a full capacity or a capacity sufficient to complete a monitoring task. For example, the mobile monitoring device 200 may be performing a monitoring task within the monitoring area 300 and may determine it has an insufficient power level to complete the monitoring task. The mobile monitoring device 200 may be programmed to abort the monitoring task prior to completion and to return to the home base 302 to recharge its battery at the recharging station 306. Once the battery of the mobile monitoring device 200 is sufficiently recharged, the mobile monitoring device 200 may be programmed to resume the assigned monitoring task or receive a new monitoring task.

In some aspects, the home base 302 is positioned outside of the boundaries of the monitoring area 300 as shown in FIG. 3. The area between the monitoring area 300 and the home base 302 may define a transport region 308. The transport region 308 may be a predefined area of the space between the monitoring area 300 and the home base 302 in which the mobile monitoring device 200 may be allowed to navigate to and from the monitoring area 300. The mobile monitoring device 200 may be programmed to avoid known obstacles in the transport region 308 in a similar manner as the monitoring area. In other aspects, the home base 302 is positioned within the monitoring area 300. Further, in some aspects, the recharging station 306 may separate from the home base 302.

The boundaries of the monitoring area 300 may be defined by boundary points 310. For example, boundary points 310 may define the rectangular monitoring area 300 shown in FIG. 3. The boundary points 310 may be stored in the mobile monitoring device 200 to indicate boundary references of the monitoring area 300. The boundary points may be coordinates or other indicators of position of the boundaries of the monitoring area 300. Within the monitoring area 300, there may be exclusion areas A, B, C in which the mobile monitoring device 200 may be programmed to avoid. The exclusion areas A, B, C are defined by boundary points 312, 314, 316, respectively, that may be stored as map information within the mobile monitoring device 200 to indicate boundary references for where the mobile monitoring device 200 may not travel. The exclusion areas A, B, C may indicate a particular region or known obstacles within the monitoring area 300 that should be avoided. For example, the monitoring area 300 may be a frack site having a tall crane. The mobile monitoring device 200 may be programmed to avoid flying within a particular radius of the crane by establishing an exclusion area around the crane using boundary points. In some aspects, the home base 302 may also be defined by boundary points.

Any number of boundary points may be used to define a bounded area. For example, the monitoring area 300 may defined by more than four boundary points 310. The minimum number of boundary points necessary to define an area may correspond to the shape of the bounded area and the number of sides of the shape of the bounded area (e.g., three boundary points for a triangle-shaped bounded area, four boundary points for a quadrilateral-shaped bounded area, etc.).

Figure 4:
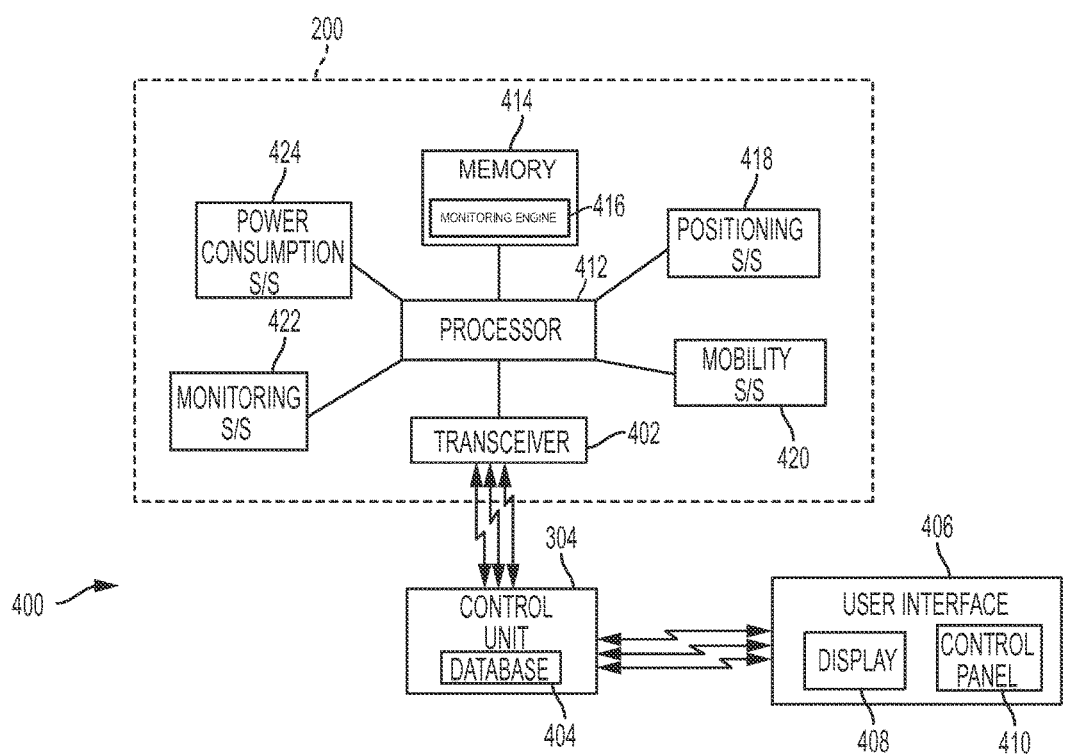
FIG. 4 is a block diagram of an example of a monitoring system according to one aspect of the present disclosure.

FIG. 4 shows a block diagram of a monitoring system 400 including the mobile monitoring device 200. The mobile monitoring device 200 is communicatively coupled to the control unit 304 via a transceiver 402 in the mobile monitoring device 200. The transceiver 402 may allow the mobile monitoring device 200 to receive a monitoring task from the control unit 304. The transceiver 402 may also allow the mobile monitoring device 200 to transmit monitoring information, such as images, recordings, or other monitoring area data to the control unit 304. The control unit 304 may include a database 404 or other data storage device for storing the monitoring information received from the mobile monitoring device 200.

The control unit 304 may be communicatively coupled to one or more displays 408 of a user interface 406 that may allow the monitoring information generated by the mobile monitoring device 200 to be viewed via a display 408 from a location local to or remote from the monitoring area 300. In some aspects, the monitoring information may be a recording stored in the database 404 of the control unit 304. The recording may be viewed on the displays 408 of the user interface 406 at any speed (e.g., slow motion, normal, double time, etc.). In additional and alternative aspects, the monitoring information may be viewed as a live feed on the display the monitoring information as the mobile monitoring device 200 is capturing the monitoring information. The ability of the user interface 406 to display a live feed may be dependent on the distance of the user interface 406 from the control unit 304 or the monitoring area 300 (e.g., a closer user interface 406 may be able to view a live feed, a remote user interface may be able to view only a delayed feed from the database 404). In some aspects, the user may control aspects of the mobile monitoring device 200 (e.g., a camera) via a control panel 410.

The mobile monitoring device 200 may include a processor 412 coupled to the transceiver 402 and subsystems of the mobile monitoring device 200. The processor 412 may include any processing device or group of processing devices for executing program code or other instructions stored in a memory 414. Examples of the processor 412 may include a microprocessor, an application-specific integrated circuit ("ASIC"), a field-programmable gate array ("FPGA"), or other suitable processor. The memory 414 can also include, for example, a non-transitory computer-readable medium. The program code can include a monitoring engine 416 that can be executed by the processor 412. The monitoring engine 416 may cause the processor 412 to process and execute a monitoring task received by the control unit 304 based on information received by one or more of the subsystems of the mobile monitoring device 200.

The subsystems of the mobile monitoring device 200 may include at least a positioning subsystem 418, a mobility subsystem 420, a monitoring subsystem 422, and a power consumption subsystem 424. The positioning subsystem 418 may allow the mobile monitoring device 200 to determine its location. In some aspects, the positioning subsystem 418 may be a global positioning subsystem including a global positioning receiver communicatively coupled to satellites. The satellites may provide the mobile monitoring device 200 with geographic coordinates indicating the position of the mobile monitoring device 200. The geographic coordinates may include horizontal coordinates and, in some aspects, vertical coordinates. In other aspects, the positioning subsystem 418 may include additional hardware and circuitry for determining the position of the mobile monitoring device 200. For example, the positioning subsystem 418 may include an altimeter for measuring the altitude of the mobile monitoring device 200. The altitude may operate in combination with a global positioning receiver or other receiver that provides a horizontal position of the mobile monitoring device 200. In alternative and additional aspects, the positioning subsystem 418 may include hardware and circuitry from determining the position of the mobile monitoring device 200 relative to the home base, monitoring area, or other area in which the mobile monitoring device is intended to travel. For example, the positioning subsystem 418 may include radar or sensor hardware to determine a position of the mobile monitoring device 200 within the monitoring area relative to the boundaries of the monitoring area or the home base. In other aspects, various technologies, hardware, and circuitry may be used to determine the position of the mobile monitoring device 200 without departing from the scope of the present disclosure (e.g., radio receivers communicatively coupled to land-based positioning transmitters, Active Bat, etc.).

The mobility subsystem 420 may allow the mobile monitoring device 200 to travel between and within a home base and the monitoring area. The mobility subsystem 420 may include, for example, a motor electrically coupled to a battery of the mobile monitoring device 200. The mobility subsystem 420 may also include the propellers 202 or other mobility components mechanically coupled to the motor to cause the mobile monitoring device 200 to move. In other examples of mobile monitoring devices, the mobility subsystem 420 may include different components without departing from the scope of the present disclosure. For example, as shown in FIG. 1, the mobile monitoring device 100 may include wheels 102. In other ground mobile monitoring devices, the mobility subsystem may include robotic legs, sliders, pedrail wheels, screw propellers, spheres, hovercrafts, etc. In other air mobile monitoring devices, the mobility subsystem 420 may include wings, gliders, gas (e.g., helium, hot air), rockets, etc. In other aspects, the mobility subsystem 420 may include alternative or additional components to travel in other environments (e.g., water propellers, paddles, etc. for water travel) or to travel in multiple environments (components for both land and air).

The monitoring subsystem 422 may allow the mobile monitoring device 200 to generate monitoring information corresponding to a task received by the mobile monitoring device 200 from the control unit 304. The monitoring subsystem 422 may include, for example, a camera 204 for generating still images or recordings of a monitoring area. The monitoring subsystem may also include other devices such a sensor, a sensor-reader, a thermometer, a detector, etc. For example, the mobile monitoring device 200 may be equipped with a carbon monoxide detector and may receive a monitoring task to determine carbon monoxide levels in a particular area prior to authorizing humans to enter the area. The monitoring subsystem 422 may include more than one monitoring component (e.g., a camera and a sensor, a camera and a detector, etc.). The components of the monitoring subsystem 422 may also be detachable or interchangeable without affecting the operation of the other subsystems of the mobile monitoring device 200. In other examples, the monitoring subsystem 422 may include additional radars or sensor hardware for avoiding obstacles in the monitoring area. For example, a crane boom may be traveling within a section of the monitoring area that is supposed to be clear from obstacles (e.g., outside of an exclusion area A, B, C). The monitoring subsystem may detect the crane boom and adjust its path to travel around, or otherwise avoid, the crane boom.

In some aspects, the components of the monitoring subsystem may dictate which tasks the mobile monitoring device 200 is able to perform. For example, the mobile monitoring device 200 may not be assigned or may not accept a task related to generating video recordings of a particular area of a frack site unless the monitoring subsystem of the mobile monitoring device 200 includes a camera or other recorder for generating video streams. In other aspects, a mobile monitoring device 200 may be programmed to return to the base station to receive an appropriate monitoring subsystem 422 for performing a monitoring task.

The power consumption subsystem 424 may provide power consumption information to allow the mobile monitoring device 200 to monitor the power levels of the mobile monitoring device 200. In some aspects, power consumption subsystem 424 may include a battery of the mobile monitoring device 200. The power consumption subsystem 424 may also include circuitry or sensors coupled to the battery for determining the power level of the battery when a monitoring task is received, or at various intervals.

Figure 5:
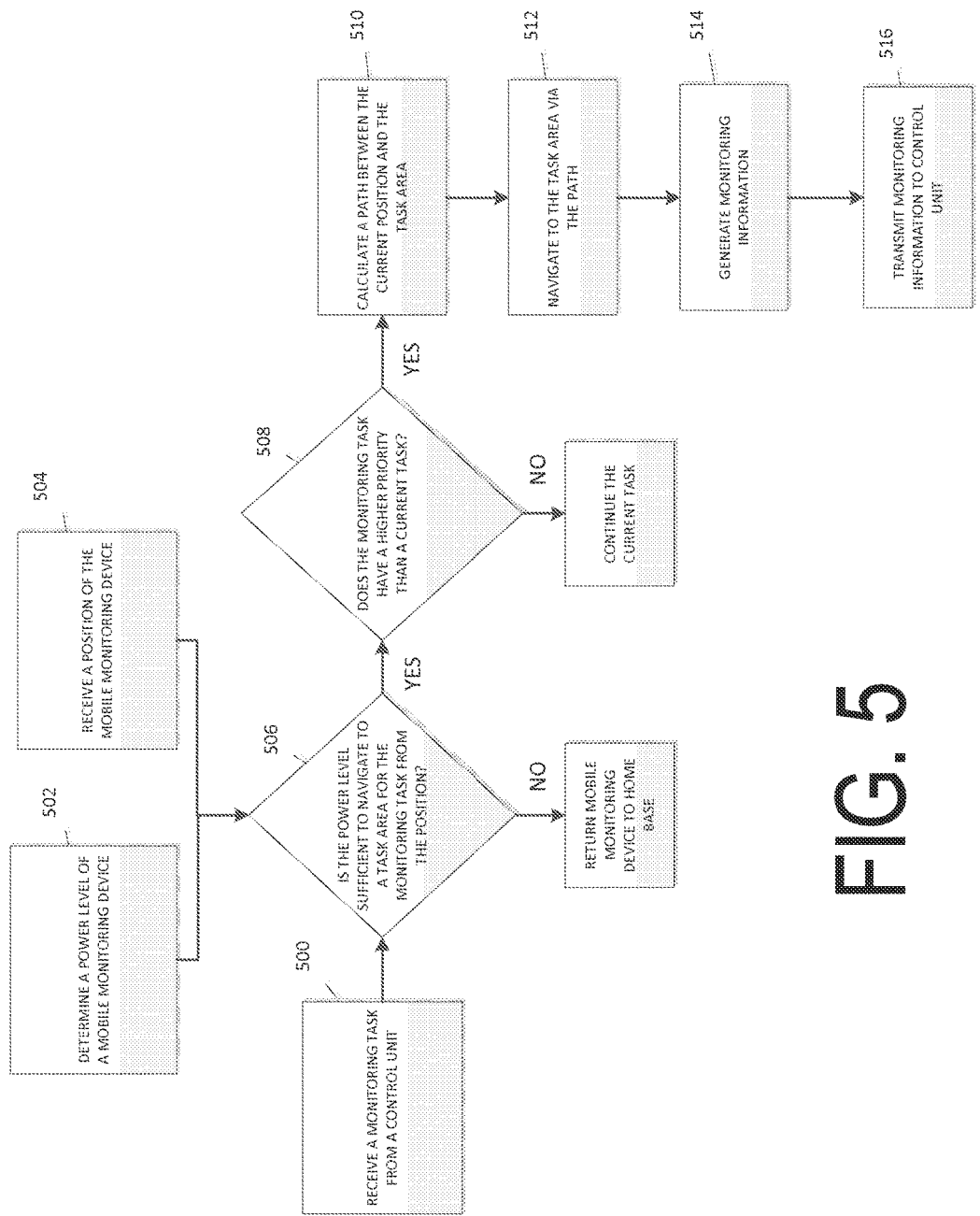
FIG. 5 is a flow diagram of a process for performing a monitoring task according to one aspect of the present disclosure.

FIG. 5 shows a flow diagram of a process for performing a monitoring task according to one aspect of the present disclosure. The process is described with respect to the monitoring system 400 shown in FIG. 4, although other implementations are possible without departing from the scope of the present disclosure.

In block 500, a monitoring task is received from the control unit 304. The control unit 304 may transmit a monitoring task to the mobile monitoring device 200 in response to a request from a user or other personnel desiring information regarding the monitoring area 300. The mobile monitoring device 200 may receive the request via the transceiver 402. The transceiver may transmit may transmit the monitoring task to the processor 412 to allow the mobile monitoring device 200 to process and perform the monitoring task.

In some aspects, the monitoring task may include a corresponding task area. The task area may be a position or area within the monitoring area 300 in which the monitoring task should be performed. For example, the monitoring task may include video surveillance of activity around a drilling rig within a frack site. The task area may include the area around the drilling rig in which the mobile monitoring device 200 must fly or hover to generate the video surveillance information. The task area may be defined by boundary points similar to the boundary points 312, 314, 316 for exclusion areas A, B, C, discussed above.

In some aspects, the monitoring task may also include a task type associated with the monitoring task. For example, the monitoring task including video surveillance may have a "recording" task type. The mobile monitoring device 200 or the control unit 304 may determine whether the mobile monitoring device 200 is properly equipped to perform a recording based on the monitoring subsystem 422 included in the mobile monitoring device 200. The processor 412 may compare the task type and the monitoring subsystem components to make the determination. If the mobile monitoring device 200 determines that it is ill-equipped to perform the monitoring task based on the task type, the mobile monitoring device 200 may send a rejection to the control unit 304 via the transceiver 402 rejecting the monitoring task. In other aspects, the monitoring engine 416 may include program code executable by the processor 412 for causing the mobile monitoring device 200 to return to the home base 302 to exchange or add the necessary components of the monitoring subsystem for completing the monitoring task.

In block 502, the power level of the mobile monitoring device 200 is determined. The power level may be determined by the power consumption subsystem 424 and transmitted to the processor 412. The power consumption subsystem 424 may determine the power level by monitoring a battery of the mobile monitoring device 200. In some aspects, the power consumption subsystem 424 may be determined in response to receiving the monitoring task from the control unit 304. In other aspects, the power consumption subsystem 424 may be continuously or intermittently determined at an interval set by the monitoring engine 416. For example, the power consumption subsystem 424 may monitor the power level of the mobile monitoring device 200 during a current task and transmit the power level to the processor 412 at regular intervals.

In block 504, the current position of the mobile monitoring device 200 is determined. The position of the mobile monitoring device 200 may be determined by the positioning subsystem 418. The positioning subsystem 418 may transmit the position information of the mobile monitoring device 200 to the processor 412.

In block 506, the mobile monitoring device 200 determines if the power level is sufficient to perform the monitoring task. The processor 412 may make this determination based on the power level received from power consumption subsystem 424 and the position information received from the positioning subsystem 418. In some aspects, the processor 412 may determine the ability of the mobile monitoring device 200 to perform the monitoring task by determining a power consumption cost for the monitoring task. The power consumption cost may be associated with the position of the mobile monitoring device when the monitoring task is received and the task area corresponding to the monitoring task. The memory may include a number of pre-stored power consumption costs. The pre-stored power consumption costs may correspond to a predetermined amount of power that would be consumed by the mobile monitoring device 200 by traveling to one or more of the outer boundaries of the monitoring area 300 (e.g., boundary points 310). The distance to the outer boundary of the monitoring area 300 used to calculate one of the pre-stored consumption costs may be compared to the distance between the current position of the mobile monitoring device 200 determined by the positioning subsystem 418 and the task area corresponding to the monitoring task received from the control unit 304. The ratio between the distances may be determined. The ratio may be applied to the power consumption cost associated with the distance to the outer boundary of the monitoring area 300 to determine the power consumption cost for the monitoring task. In some aspects, the power consumption cost may be stored in the memory 414 for a determination of the ability of the mobile monitoring device 200 to perform future monitoring tasks in the monitoring area 300.

The ability of the mobile monitoring device 200 to perform a monitoring task may also be determined in other ways without departing from the scope of the present disclosure. For example, the determination may take into account the amount of time the monitoring task is expected to take, deviations in a path to the task area calculated by the processor 412, or other information received from the control unit 304 or determined by the processor 412.

If the processor 412 determines that the power level of the mobile monitoring device 200 is insufficient to perform the monitoring task, the mobile monitoring device 200 may return to the home base 302 to replenish the battery power at the recharging station 306. In some aspects, the mobile monitoring device 200 may accept the monitoring task even if a determination is made that the power level is insufficient to perform the task. The mobile monitoring device 200 may return to the recharging station 306 and then travel to the monitoring area 300 to perform the monitoring task as described in the remaining steps of FIG. 5.

In block 508, the mobile monitoring device 200 may determine whether to abort a current task based on a priority level of the monitoring task received from the control unit 304. In some aspects, the monitoring tasks received from the control unit 304 include a priority level. In such aspects, the processor 412 may compare the priority level of a current task being performed by the mobile monitoring device 200 with the priority level of the monitoring task received from the control unit 304 and only accept the monitoring task if the priority level of the newer task is higher. If the priority level is not higher, transceiver 402 may transmit a rejection of monitoring task to the control unit 304 and continue performing the current task.

In some aspects, the priority level of the new monitoring task may be based on a determination by the control unit 304. For example, the control unit may override the current task of the mobile monitoring device 200 and instruct the mobile monitoring device 200 to perform the new monitoring task. In other aspects, the priority of the current task may be determined by the task area associated with the monitoring task. A priority level may be associated with the monitoring task as described above or the priority level may be stored in the memory 414 of the mobile monitoring device 200 based on task areas within the monitoring area 300.

Figure 6:
FIG. 6 is an aerial view of one example of a monitoring area for a monitoring system according to one aspect of the present disclosure.
Figure 7:
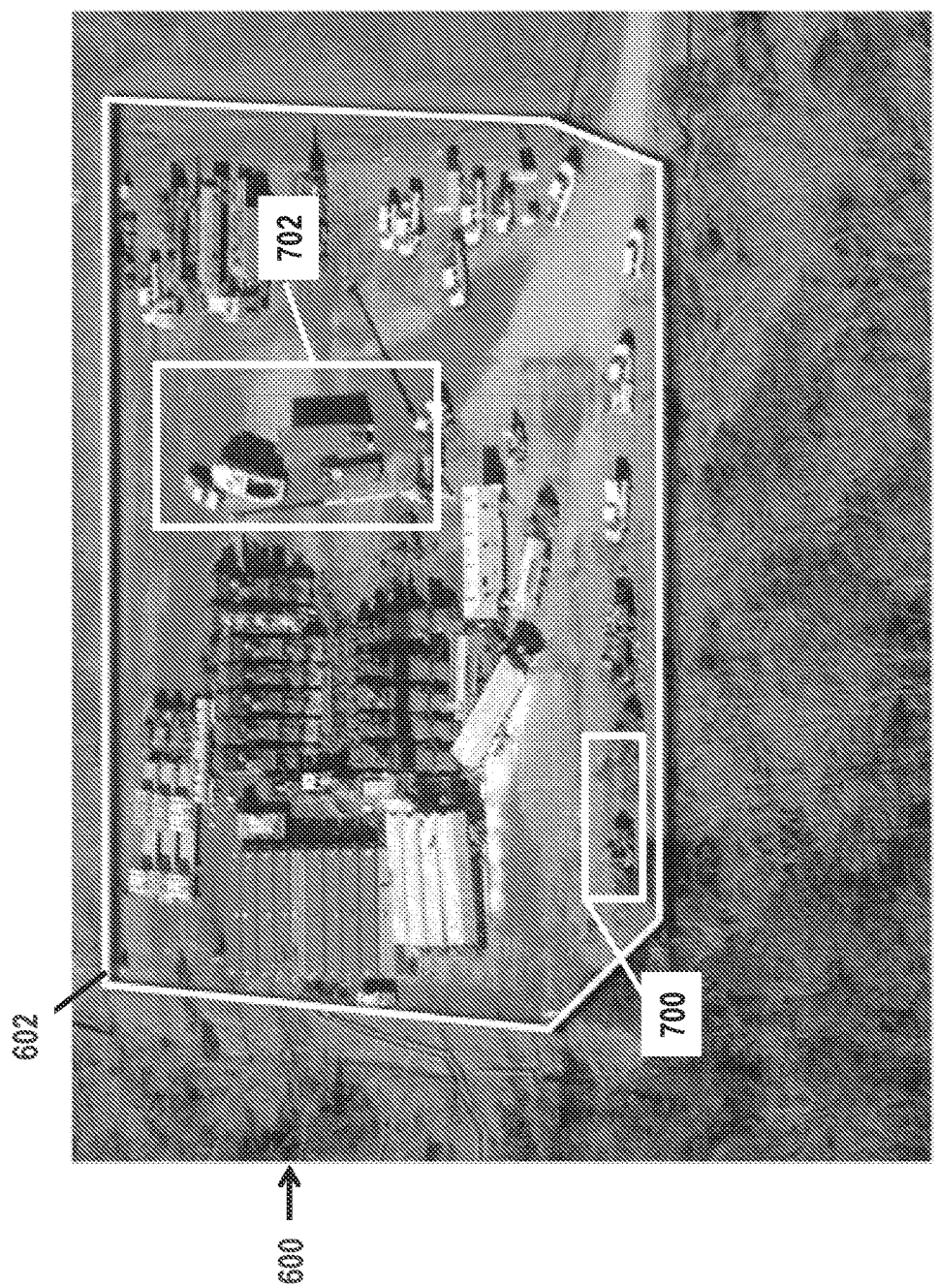
FIG. 7 is an aerial view of task areas internal to the monitoring area of FIG. 6 according to one aspect of the present disclosure.
Figure 8:
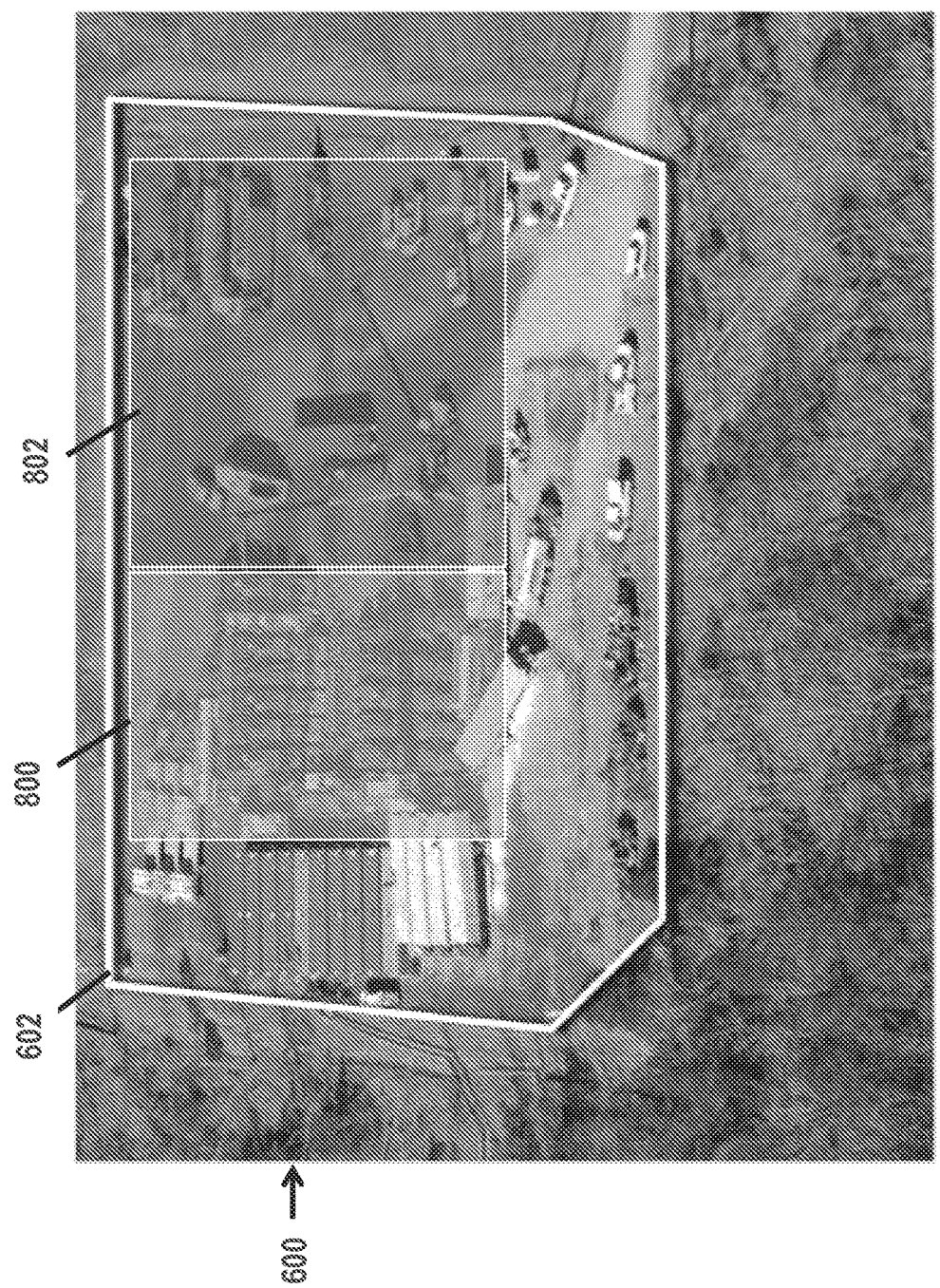
FIG. 8 is an aerial view of adjustment areas internal to the monitoring area of FIG. 6 according to one aspect of the present disclosure.

For example, FIGS. 6-8 shows an example of a frack site 600 having oilfield equipment of various types. As shown in FIG. 6, a monitoring area 602 is defined for the frack site 600 for monitoring by the mobile monitoring device 200. In FIG. 7, two task areas 700, 702 are defined within the monitoring area 602. A higher priority level may be associated with task area 700 than task area 702. If the mobile monitoring device 200 is currently performing a monitoring task in task area 702 and receives a new monitoring task from the control unit 304 in task area 700, the mobile monitoring device 200 may abort the current task and navigate to task area 700 to perform the new monitoring task. If the mobile monitoring device 200 is currently performing a monitoring task in task area 700 and receives a new monitoring task from the control unit 304 in task area 702, the mobile monitoring device 200 may reject the new monitoring task and continue the monitoring task in task area 700.

In some aspects, the control unit 304 may be integrated with ground sensors defining task areas 700, 702 as areas that may be automatically monitored. Task area 700 may be defined as a critical area having a hazard, a safety concern, secured information, or other reasons for special monitoring of activity within the task area 700. In the event that the ground sensors detect entry or movement in task area 700, the control unit 304 may assign the mobile monitoring device 200 a monitoring task in task area 700 to generate a video recording of the area to capture any activity within task area 700. Task area 702 may be defined as a critical area with a lessor monitoring priority. In the event that entry or movement is detected in task area 702, the control unit 304 may log the event, but only send the mobile monitoring device 200 to perform video surveillance if the mobile monitoring device 200 is not performing a monitoring task in a task area having a higher priority (e.g., task area 700).

In block 510, a path between the current position of the mobile monitoring device 200 and the task area associated with the monitoring task is calculated. The processor 412 may receive the current position of the mobile monitoring device 200 from the positioning subsystem 418. In some aspects, the processor 412 may also receive information from the mobility subsystem to determine a mobility type that may be considered in calculating the path (e.g., a ground path vs. an aerial path). Using map information stored in the memory 414 of the mobile monitoring device 200, the processor 412 may determine a path to the task area that avoids obstacles or other hazards in the monitoring area 300 or the transport region 308. In some aspects, the map information stored in the memory 414 may be the boundary points 310, 312, 314, 316 defining the monitoring area 300 and exclusion areas A, B, C. The processor 412 may calculate a path to the task area that avoids any of exclusion areas A, B, C.

In some aspects, the monitoring area 300 may also include adjustment areas. The adjustment areas, like the monitoring area 300 and exclusion areas A, B, C may be defined by corresponding boundary points that are stored in the memory 414. The monitoring engine 416 may include program code to cause the mobile monitoring device 200 to adjust the travel pattern or travel behavior of the mobile monitoring device 200 when a path calculated by the processor 412 traverses an adjustment area. For example, in some aspects, the mobile monitoring device 200 may be programmed to travel within a threshold altitude (e.g., between an altitude floor and an altitude ceiling). This threshold may be adjusted when the mobile monitoring device 200 travels in an adjustment area. This threshold may be stored in the memory 414 of the mobile monitoring device 200.

FIG. 8 shows the monitoring area 602 including adjustment areas 800, 802. Adjustment area 800 may include a number of oilfield equipment with none of the oilfield equipment extending above a certain height. Conversely, adjustment area 802 may include tall oilfield equipment throughout adjustment area 802 that are mobile (e.g., not always located in the same position). Due to the mobile nature of the oilfield equipment within adjustment area 802, establishing an exclusion area around the equipment may not be an option. When the mobile monitoring device 200 enters adjustment area 800, the mobile monitoring device 200 may be programmed to adjust its altitude floor to just above the height of the oilfield equipment. This may allow the mobile monitoring device 200 to pass through adjustment area 800 or perform monitoring tasks within adjustment area 800 without a risk of contacting the oilfield equipment in adjustment area 800. When the mobile monitoring device 200 enters adjustment area 802, the mobile monitoring device 200 may be programmed to adjust its altitude floor to just above the height of the tallest piece of oilfield equipment operating within adjustment area 802. This may allow the mobile monitoring device 200 to pass through adjustment area 802 or perform monitoring tasks within adjustment area 802 without the risk of contacting the oilfield equipment in adjustment area 802.

In block 512, the mobile monitoring device 200 navigates along the calculated path to the task area of the monitoring task. The mobile monitoring device 200 may navigate to the path semi-autonomously without the use of a remote control by following the calculated path. Since the path may be calculated to avoid obstacles by taking into account boundary points, threshold altitudes, exclusion area, and adjustment areas, the risk of the mobile monitoring device 200 contacting an obstacle in the monitoring area may be significant lowered.

Figure 9:
FIG. 9 is an aerial view of a second example of a monitoring area for a monitoring system according to one aspect of the present disclosure.
Figure 10:
FIG. 10 is an aerial view of object overlays representing objects having sensors within the monitoring area of FIG. 9 according to one aspect of the present disclosure.

In block 514, monitoring information is generated. The monitoring information may be generated by one or more components of the monitoring subsystem 422. For example, the monitoring subsystem 422 may include a camera for generating video recordings or still images within the monitoring area 300 or task area. In other examples, the monitoring subsystem 422 may include alternative or additional devices for generating monitoring information, such as a reader for interfacing with sensors within the monitoring area 300 or task area and interpreting data from the sensors. In one such example, FIGS. 9 and 10 show a frack site 900 having a monitoring area 902. Some oilfield equipment or personnel within the monitoring area 902 may include sensors attached and visible to mobile monitoring device 200 as it navigates within the monitoring area 902. A sensor reader included in the monitoring subsystem 422 may interface with a sensor attached to an object and create an overlay 1000 representing the object or a group of objects having the sensor.

In some aspects, the overlays 1000 representing the sensors may be viewable to a user of the user interface 406 via the display 408. The control panel 410 of the user interface 406 may allow the user to request monitoring information regarding a specific object in the monitoring area by selecting the overlay 1000 representing the object. The control unit 304 may transmit a monitoring task to the mobile monitoring device to generate monitoring information related to the object in response to the selection of the overlay 1000 representing the sensor attached to the object. In some examples, the monitoring tasks may be generated using heuristic algorithms that process equipment sensor data received by the control unit 304 or job coordinating software used by or in communication with the control unit 304. For example, an identifier for a tanker truck may be recorded in job coordinating software. The recording may generate a monitoring task to capture a video recording of an inspection of the tanker truck. Further, the overlay 1000 may be updated in response to logging the location of the equipment during the job.

In alternative and additional aspects, the monitoring task received by the mobile monitoring device 200 may require locating personnel or a piece of equipment in the monitoring area 902 prior and provide images of the personnel or equipment once located. The monitoring subsystem 422 may include a sensor reader and a camera to perform the monitoring task. The mobile monitoring device 200 may be programmed to locate the proper personnel or equipment by interfacing with one or more sensors in the monitoring area 902 until the correct sensor is found. In this respect, the sensor may be similar to a task area corresponding to the monitoring device. Once the proper personnel or equipment is located, the mobile monitoring device 200 may generate the still images of the personnel or equipment in the monitoring area 902.

Although the present disclosure describes sensors for locating and identifying personnel and oilfield equipment, a number of different technologies may be used for this purpose without departing from the scope of the present disclosure. For example, the mobile monitoring device 200 may be tasked to locate a frack site operator within the monitoring area 902. Rather than sensors, the monitoring subsystem 422 may be equipped with facial recognition hardware and software to allow the mobile monitoring device 200 to locate or identify the frack site operator based on his or her facial features.

In block 516, the monitoring information generated by the mobile monitoring device 200 is transmitted to the control unit 304. In some aspects, the monitoring information is stored in the database 404. In some aspects, the monitoring information is immediately relayed by the control unit 304 to an employee or other personnel (e.g., a live feed of a video being generated by the monitoring subsystem 422).

Figure 11:
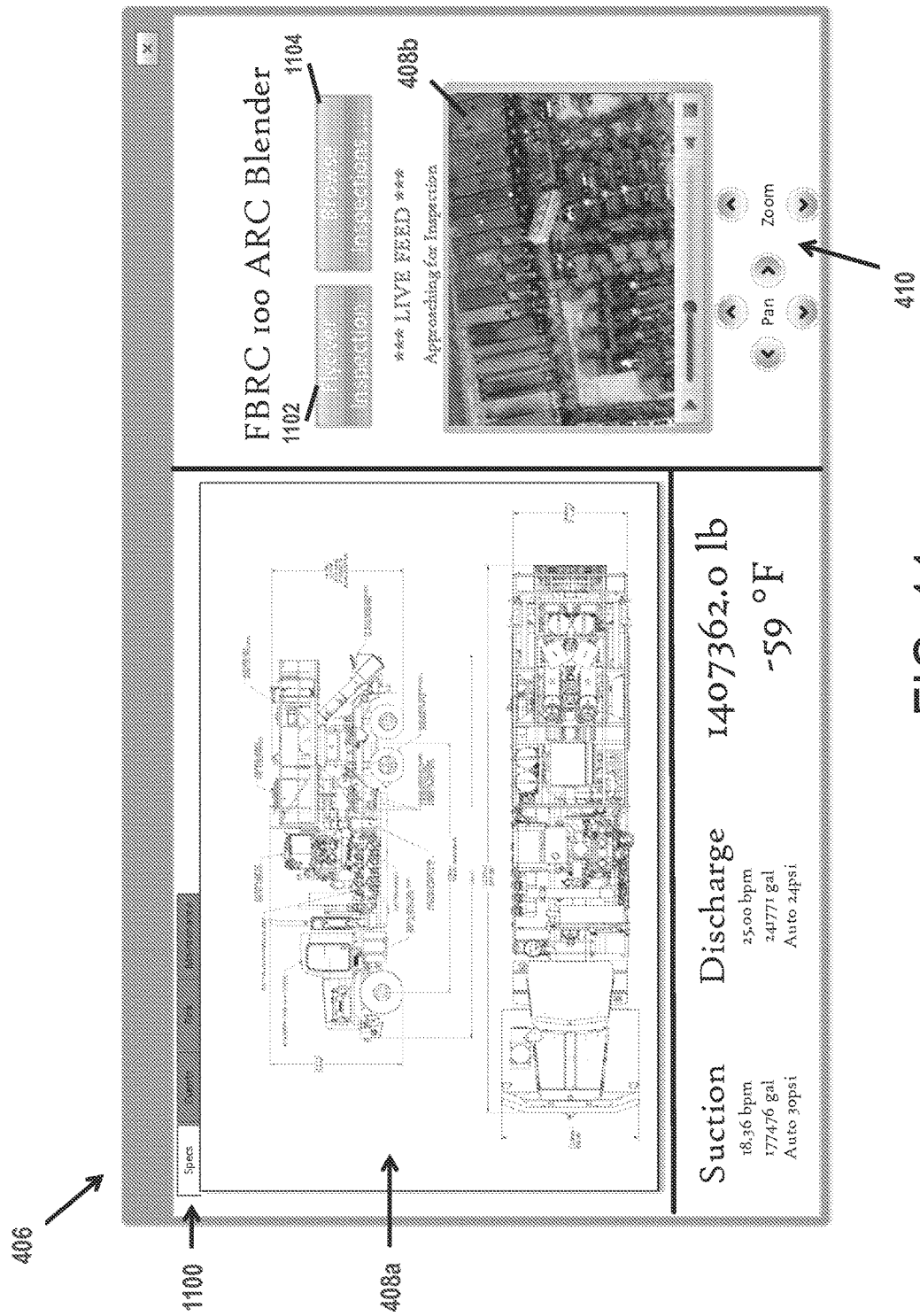
FIG. 11 is an example of a user interface for a mobile monitoring system according to one aspect of the present disclosure.

In some embodiments, the employee may use a user interface to request a monitoring task or access monitoring information. FIG. 11 shows a screenshot of the user interface 406 communicatively coupled to the control unit 304. The user interface 406 includes displays 310*a*, 310*b* to view task information related to the monitoring task and monitoring information generated by the monitoring subsystem 422 of the mobile monitoring device 200. The display 408*a* includes tabs 1100 that allow the employee to view specification information, event information, risk information, and maintenance information related to a monitoring task. This task information may be stored in the database 404 of the control unit 304. The specification information may be information related to the technical specifications or identity of oilfield equipment or personnel in the monitoring area 902. For example, the display 408*a* shows specification information about a tanker truck located in the monitoring area 902. The event information may include historical or other event information related to the tanker truck and logged in the database 404. The risk information may include any identified or potential hazards, risk projections, safety concerns, or other information concerning risks related to the tanker truck. The maintenance information may include historical maintenance performed on the tanker truck, maintenance manuals, current running parameters, upcoming preventative maintenance milestones, or other maintenance information related to the tanker truck. Although only these four tabs 1100 are shown in the display 408*a*, any number of tabs, including none, may be present in the display 408*a* relating to any monitoring information concerning the monitoring task.

The display 408*b* allows the employee to view a live feed or recording of monitoring information generated by the mobile monitoring device 200. In some aspects, the employee is able to control components of the monitoring subsystem 422 of the mobile monitoring device 200 while the mobile monitoring device 200 is executing a monitoring task. For example, the employee may use the selection option 1102 labeled "Flyover Inspection" to request a monitoring task of a flyover recording of a tanker truck in the monitoring area 902. In response to the request, the control unit 304 may transmit the monitoring task to the mobile monitoring device 200 to perform the flyover inspection of the tanker truck. The mobile monitoring device 200 may generate video footage of the tanker truck in the monitoring area 902 and transmit the video footage to the control unit 304. The control unit 304 may relay the video footage to the user interface 406 for viewing by the employee. The pan and zoom capabilities of the control panel 410 may allow the employee to control the direction and zoom level of the camera generating the video footage as the footage is being generated. The user interface may also include a selection option 1104 labeled "Browse Inspections." This selection option 1104 may allow the employee to select previous video footage of the tanker truck or another piece of equipment in the monitoring area 902 from the database 404 of the control unit 304 for viewing on the display 408*b*.

Although the present disclosure generally describes the use of a single mobile monitoring device 200 in a monitoring area 300, the monitoring system 400 may include any number of mobile monitoring devices 100, 200. In some aspects, the mobile monitoring devices 100, 200 may be communicatively coupled to each other via their respective transceiver 402 or via the control unit 304. The mobile monitoring devices 100, 200 may be a combination of various types for traveling via ground, air, and water. Further, the mobile monitoring devices 100, 200 may operate in combination to complete monitoring tasks. For example, the control unit 304 may transmit a monitoring task to all of the mobile monitoring devices 100, 200 operating in the monitoring area 902. The mobile monitoring devices 100, 200 may be programmed to determine which of the mobile monitoring devices 100, 200 is available or best for performing the monitoring task. This may be based on the monitoring subsystem 422 included in each of the monitoring devices 100, 200, which monitoring device 100, 200 is available, which monitoring device 100, 200 is closest to the task area of the monitoring task, a priority level associated with the monitoring task or task area, or any other determining factors. Further, the mobile monitoring devices 100, 200 may include sensors, sensor readers, or other components for identifying the location of other mobile monitoring devices 100, 200 in the monitoring area 300 to determine which mobile monitoring device 100, 200 is closest to a task area. The components may also be used by the processor 412 of each mobile monitoring device to ensure that the mobile monitoring devices 100, 200 do not contact or collide during navigation between and within the home base 302 and the monitoring area 300.

In other examples, the control unit 304 may determine which of the mobile monitoring devices 100, 200 is available or best for performing the monitoring task. The control unit 304 may determine which monitoring devices 100, 200 have the proper monitoring subsystem 422 for a monitoring task or which monitoring device 100, 200 is closest to the task area, and assign the monitoring task to one or more of the monitoring devices 100, 200 accordingly. Further, communication between the control unit 304 and the mobile monitoring device 100, 200 may allow the control unit 304 to determine which monitoring devices are available for receiving a monitoring task. The communication may also allow the control unit 304 to coordinate the assignment of monitoring tasks based on availability of the mobile monitoring device 100, 200, the priority level of the task being performed by the mobile monitoring device 100, 200, the location of the mobile monitoring device 100, 200, the completion of the monitoring task (e.g., how close the mobile monitoring device 100, 200 may be to completing the monitoring task, whether the monitoring task is complete), or some other information communicated between the control unit 304 and the mobile monitoring device 100, 200. In some aspects, the control unit 304 may generate a queue having one or more monitoring task to be transmitted to the monitoring device 100, 200 upon completion of an assigned monitoring task.

The control unit 304 may also be able to detect when communication with the mobile monitoring device 100, 200 is "lost" (e.g., due to a crash, malfunction, shot down, or other catastrophic event). A loss of communication may cause the monitoring task that was being performed by the lost mobile monitoring device 100, 200 to be reassigned to a new device. The control unit 304 may also forego assigning (or attempt to assign) a new monitoring task to the lost device.

In some aspects, the monitoring systems described are provided according to one or more of the following examples Example 1: A monitoring system may include a mobile monitoring device. The mobile monitoring device may include a monitoring subsystem for generating monitoring information and a processor for causing the mobile monitoring device to determine a position of the mobile monitoring device. The processor may also cause the mobile monitoring device to determine an ability of the mobile monitoring device to perform a monitoring task based on a power level of the mobile monitoring device and a distance between the position of the mobile monitoring device and a task area corresponding to the monitoring task in a monitoring area. The processor may also cause the mobile monitoring device to calculate a path between the position of the mobile monitoring device and the task area that avoids exclusion areas based on boundary points stored in a memory of the mobile monitoring device. The monitoring system may also include a control unit communicatively coupled to the mobile monitoring device for transmitting the monitoring task to the mobile monitoring device and receiving the monitoring information from the mobile monitoring device.

Example 2: The monitoring system of Example 1 may further include a user interface. The user interface may include a display that is communicatively coupled to the control unit for transmitting a request for the monitoring information. The control unit may be configured to transmit the monitoring task to the mobile monitoring device in response to the request.

Example 3: The monitoring system of Examples 1-2, wherein the user interface includes a control panel for controlling an aspect of the monitoring subsystem of the mobile monitoring device.

Example 4: The monitoring system of Example 3 may feature the monitoring subsystem including a camera. The monitoring information may include a video feed generated by the camera. The control panel may include selection options for allowing a user to control a zoom level or a direction of the camera during generation of the monitoring information.

Example 5: The monitoring system of Examples 1-4 may also feature the control unit communicatively coupled to the mobile monitoring device for monitoring completion of the monitoring task to determine an availability of the mobile monitoring device to receive a new monitoring task.

Example 6: The monitoring system of Examples 1-5 may also feature the processor configured to cause the mobile monitoring device to determine the ability of the mobile monitoring device to perform the monitoring task by retrieving a stored power consumption cost representing an amount of power consumed by the mobile monitoring device traveling a known distance to an outer boundary of the monitoring area. The processor may also be configured to cause the mobile monitoring device to determine the ability of the mobile monitoring device to perform the monitoring task by calculating a ratio between the known distance and the distance between the position of the mobile monitoring device and the task area. The processor may also be configured to cause the mobile monitoring device to determine the ability of the mobile monitoring device to perform the monitoring task by determining a task power consumption cost for the monitoring task by applying the ratio to the amount of power consumed by the mobile monitoring device traveling the known distance to the outer boundary of the monitoring area. The processor may also be configured to cause the mobile monitoring device to determine the ability of the mobile monitoring device to perform the monitoring task by comparing the task power consumption cost and the power level of the mobile monitoring device.

Example 7: The monitoring system of Examples 1-6 may feature the processor being configured to cause the mobile monitoring device to calculate the path between the position of the mobile monitoring device and the task area that avoids the exclusion areas by retrieving boundary points representing task area boundaries and exclusion area boundaries. The processor may also be configured to cause the mobile monitoring device to calculate the path between the position of the mobile monitoring device and the task area that avoids the exclusion areas by determining the exclusion area boundaries between the position of the mobile monitoring device and the task area boundaries.

Example 8: The monitoring system of Examples 1-7 may also include one or more ground sensors communicatively coupled to the control unit and positioned in a critical area of the monitoring area. The control unit may be configured to transmit a surveillance task to the mobile monitoring device in response to a detection signal from the one or more ground sensors. The processor may be configured to cause the mobile monitoring device to calculate the path to the critical area that avoids the exclusion areas. The monitoring subsystem may generate the monitoring information in the critical area.

Example 9: The monitoring system of Examples 1-9 may feature the monitoring area including an oilfield. The task area may relate to oilfield equipment. The control unit may transmit a monitoring task to the mobile monitoring device in response to a request for data related to the oilfield equipment.

Example 10: A mobile monitoring device may include a transceiver communicatively coupled to a control unit for receiving a monitoring task from the control unit and for transmitting monitoring information to the control unit. The mobile monitoring device may also include a processor coupled to the transceiver and a plurality of systems. The processor may be configured to determine an ability of the mobile monitoring device to perform the monitoring task based on a power level of the mobile monitoring device and a distance between a position of the mobile monitoring device and a task area corresponding to the monitoring task. The mobile monitoring device may also include memory communicatively coupled to the at least one processor for storing a set of instructions and map information. The map information may correspond to a monitoring area, the task area, a home base, or a transport region between the monitoring area and the home base. The set of instructions may be executable by the at least one processor for causing the mobile monitoring device to autonomously avoid obstacles when the mobile monitoring device navigates in the transport region or monitoring area.

Example 11: The mobile monitoring device of Example 10 may further include the plurality of subsystems. The plurality of subsystems may include a positioning subsystem for determining the position of the mobile monitoring device. The plurality of subsystems may also include a mobility subsystem for navigating the mobile monitoring device between the home base and the monitoring area. The plurality of subsystems may also include a power consumption subsystem for determining the power level of the mobile monitoring device. The plurality of subsystems may also include a monitoring subsystem for generating the monitoring information corresponding to the monitoring task.

Example 12: The mobile monitoring device of Example 11 may feature the monitoring area including an oilfield. The mobile monitoring device may further feature the monitoring subsystem including a reader for locating equipment in the oilfield by interfacing with a sensor affixed to the equipment. The mobile monitoring device may further feature the monitoring subsystem including a camera for generating images or video of the equipment subsequent to locating the equipment.

Example 13: The mobile monitoring device of Examples 10-12 may feature the map information including boundary points defining one or more exclusion areas representing oilfield equipment or a hazardous area of an oilfield. The set of instructions may include one or more algorithms for causing the processor to calculate a path from the position of the mobile monitoring device to the task area that avoids the one or more exclusion areas.

Example 14: The mobile monitoring device of Examples 10-13 may feature the map information includes boundary points defining one or more adjustment areas within the monitoring area, wherein the set of instructions include one or more algorithms for causing the processor to adjust a flight altitude threshold of the mobile monitoring device when the mobile monitoring device is navigating within the one or more adjustment areas.

Example 15: A method may include receiving a monitoring task to perform in a monitoring area by a mobile monitoring device. The monitoring task may be received from a control unit. The method may also include receiving a position of the mobile monitoring device. The method may also include determining a power level of the mobile monitoring device. The method may also include determining an ability to perform the monitoring task based on the position and the power level. The method may also include calculating a path from the position to a task area associated with the monitoring task and within the monitoring area. The method may also include navigating the path to the task area. The method may also include generating monitoring information. The method may also include transmitting the monitoring information to the control unit.

Example 16: The method of Example 15 may feature determining the ability to perform the monitoring task to include retrieving a stored power consumption cost representing an amount of power consumed by the mobile monitoring device traveling a known distance to a boundary of the monitoring area. Determining the ability to perform the monitoring task may also include calculating a ratio between the known distance and a distance between the position of the mobile monitoring device and the task area. Determining the ability to perform the monitoring task may also include determining a task power consumption cost for the monitoring task by applying the ratio to the amount of power consumed by the mobile monitoring device traveling the known distance to an outer boundary of the monitoring area. Determining the ability to perform the monitoring task may also include comparing the task power consumption cost and the power level of the mobile monitoring device.

Example 17: The method of Examples 15-16 may further include monitoring a power consumption associated with the mobile monitoring device during performance of the monitoring task. The method may also include determining an inability to complete the monitoring task based on the power consumption. The method may also include navigating to a recharging station to charge a battery of the mobile monitoring device.

Example 18: The method of Examples 15-17 may further include receiving an overriding task from the control unit. The overriding task may include a priority indicator for preempting performance of the monitoring task. The method may also include aborting the monitoring task based on the priority indicator. The method may also include calculating a new path from the task area to a new task area associated with the overriding task. The method may also include navigating the new path to the new task area. The method may also include generating new monitoring information associated with the overriding task. The method may also include transmitting the new monitoring information to the control unit.

Example 19: The method of Examples 15-18 may further include the monitoring area being an oilfield. The method may also include calculating the path from the position to the task area to include retrieving boundary points representing boundaries of a task area within the oilfield. Calculating the path from the position to the task area may further include retrieving exclusion area boundary points representing at least one object or hazardous area within the oilfield. Calculating the path from the position to the task area may further include determining the at least one object or hazardous area between the position of the mobile monitoring device and the boundaries of the task area. Calculating the path from the position to the task area may further include calculating the path to avoid the at least one object or hazardous area within the oilfield based on the exclusion area boundary points.

Example 20: The method of Examples 15-19 may feature navigating the path to the task area to include retrieving boundary points representing an adjustment area. Navigating the path to the task area may further include adjusting an altitude threshold for the mobile monitoring device when the mobile monitoring device is navigating within the adjustment area.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A monitoring system, comprising:
a mobile monitoring device including a monitoring subsystem for generating monitoring information and a processor for causing the mobile monitoring device to:
determine a position of the mobile monitoring device;
determine an ability of the mobile monitoring device to perform a monitoring task based on a power level of the mobile monitoring device and a distance between the position of the mobile monitoring device and a task area corresponding to the monitoring task in a monitoring area, wherein the monitoring area is an oilfield and the task area relates to oilfield equipment; and
calculate a path between the position of the mobile monitoring device and the task area that avoids exclusion areas based on boundary points stored in a memory of the mobile monitoring device; and
a control unit communicatively coupled to the mobile monitoring device for transmitting the monitoring task to the mobile monitoring device and receiving the monitoring information from the mobile monitoring device.

2. The monitoring system of claim 1, further comprising a user interface having a display that is communicatively coupled to the control unit for transmitting a request for the monitoring information, wherein the control unit is configured to transmit the monitoring task to the mobile monitoring device in response to the request.

3. The monitoring system of claim 2, wherein the user interface includes a control panel for controlling an aspect of the monitoring subsystem of the mobile monitoring device.

4. The monitoring system of claim 3, wherein the monitoring subsystem includes a camera, wherein the monitoring information includes a video feed generated by the camera, wherein the control panel includes selection options for allowing a user to control a zoom level or a direction of the camera during generation of the monitoring information.

5. The monitoring system of claim 1, wherein the control unit is further communicatively coupled to the mobile monitoring device for monitoring completion of the monitoring task to determine an availability of the mobile monitoring device to receive a new monitoring task.

6. The monitoring system of claim 1, wherein the processor is configured to cause the mobile monitoring device to determine the ability of the mobile monitoring device to perform the monitoring task by:
retrieving a stored power consumption cost representing an amount of power consumed by the mobile monitoring device traveling a known distance to an outer boundary of the monitoring area;
calculating a ratio between the known distance and the distance between the position of the mobile monitoring device and the task area;
determining a task power consumption cost for the monitoring task by applying the ratio to the amount of power consumed by the mobile monitoring device traveling the known distance to the outer boundary of the monitoring area; and
comparing the task power consumption cost and the power level of the mobile monitoring device.

7. The monitoring system of claim 1, wherein the processor is configured to cause the mobile monitoring device to calculate the path between the position of the mobile monitoring device and the task area that avoids the exclusion areas by:
retrieving boundary points representing task area boundaries and exclusion area boundaries; and
determining the exclusion area boundaries between the position of the mobile monitoring device and the task area boundaries.

8. The monitoring system of claim 1, further including one or more ground sensors communicatively coupled to the control unit and positioned in a critical area of the monitoring area,
wherein the control unit is configured to transmit a surveillance task to the mobile monitoring device in response to a detection signal from the one or more ground sensors,
wherein the processor is configured to cause the mobile monitoring device to calculate the path to the critical area that avoids the exclusion areas,
wherein the monitoring subsystem generates the monitoring information in the critical area.

9. The monitoring system of claim 1, wherein the control unit is configured to transmit a command for implementing the monitoring task to the mobile monitoring device in response to a request for data related to the oilfield equipment.

10. A mobile monitoring device, comprising:
a transceiver communicatively coupled to a control unit for receiving a monitoring task from the control unit and for transmitting monitoring information to the control unit;
a processor coupled to the transceiver and a plurality of systems, the processor being configured to determine an ability of the mobile monitoring device to perform the monitoring task based on a power level of the mobile monitoring device and a distance between a position of the mobile monitoring device and a task area corresponding to the monitoring task in a monitoring area, wherein the monitoring area is an oilfield and the task area relates to oilfield equipment; and memory communicatively coupled to the processor for storing a set of instructions and map information, the map information corresponding to a monitoring area, the task area, a home base, or a transport region between the monitoring area and the home base, the set of instructions being executable by the processor for causing the mobile monitoring device to autonomously avoid obstacles when the mobile monitoring device navigates in the transport region or monitoring area.

11. The mobile monitoring device of claim 10, further including the plurality of systems, the plurality of systems comprising:
   a positioning subsystem for determining the position of the mobile monitoring device;
   a mobility subsystem for navigating the mobile monitoring device between the home base and the monitoring area;
   a power consumption subsystem for determining the power level of the mobile monitoring device; and
   a monitoring subsystem for generating the monitoring information corresponding to the monitoring task.

12. The mobile monitoring device of claim 11, wherein the monitoring subsystem includes a reader for locating equipment in the oilfield by interfacing with a sensor affixed to the equipment, wherein the monitoring subsystem further includes a camera for generating images or video of the equipment subsequent to locating the equipment.

13. The mobile monitoring device of claim 10, wherein the map information includes boundary points defining one or more exclusion areas representing oilfield equipment or a hazardous area of an oilfield, wherein the set of instructions include one or more algorithms for causing the processor to calculate a path from the position of the mobile monitoring device to the task area that avoids the one or more exclusion areas.

14. The mobile monitoring device of claim 10, wherein the map information includes boundary points defining one or more adjustment areas within the monitoring area, wherein the set of instructions include one or more algorithms for causing the processor to adjust a flight altitude threshold of the mobile monitoring device when the mobile monitoring device is navigating within the one or more adjustment areas.

15. A method, comprising:
   receiving, from a control unit, a monitoring task to perform in a monitoring area by a mobile monitoring device, wherein the monitoring area is an oilfield;
   receiving a position of the mobile monitoring device;
   determining a power level of the mobile monitoring device;
   determining an ability to perform the monitoring task based on the position and the power level;
   calculating a path from the position to a task area associated with the monitoring task and within the monitoring area, wherein the task area relates to oilfield equipment;
   navigating the path to the task area;
   generating monitoring information; and
   transmitting the monitoring information to the control unit.

16. The method of claim 15, wherein determining the ability to perform the monitoring task includes:
   retrieving a stored power consumption cost representing an amount of power consumed by the mobile monitoring device traveling a known distance to a boundary of the monitoring area;
   calculating a ratio between the known distance and a distance between the position of the mobile monitoring device and the task area;
   determining a task power consumption cost for the monitoring task by applying the ratio to the amount of power consumed by the mobile monitoring device traveling the known distance to an outer boundary of the monitoring area; and
   comparing the task power consumption cost and the power level of the mobile monitoring device.

17. The method of claim 15, further comprising:
   monitoring a power consumption associated with the mobile monitoring device during performance of the monitoring task;
   determining an inability to complete the monitoring task based on the power consumption; and
   navigating to a recharging station to charge a battery of the mobile monitoring device.

18. The method of claim 15, further comprising:
   receiving an overriding task from the control unit, wherein the overriding task includes a priority indicator for preempting performance of the monitoring task;
   aborting the monitoring task based on the priority indicator;
   calculating a new path from the task area to a new task area associated with the overriding task;
   navigating the new path to the new task area;
   generating new monitoring information associated with the overriding task; and
   transmitting the new monitoring information to the control unit.

19. The method of claim 15, wherein calculating the path from the position to the task area includes:
   retrieving boundary points representing boundaries of the task area within the oilfield;
   retrieving exclusion area boundary points representing at least one object or hazardous area within the oilfield;
   determining the at least one object or hazardous area between the position of the mobile monitoring device and the boundaries of the task area; and
   calculating the path to avoid the at least one object or hazardous area within the oilfield based on the exclusion area boundary points.

20. The method of claim 15, wherein navigating the path to the task area includes:
   retrieving boundary points representing an adjustment area; and
   adjusting an altitude threshold for the mobile monitoring device when the mobile monitoring device is navigating within the adjustment area.

* * * * *